US012327329B2

(12) United States Patent
Sasagawa

(10) Patent No.: US 12,327,329 B2
(45) Date of Patent: Jun. 10, 2025

(54) METHOD FOR COMPLEMENTING COLOR IMAGE USING MACHINE-LEARNING MODEL

(71) Applicant: Socionext Inc., Kanagawa (JP)

(72) Inventor: Yukihiro Sasagawa, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 427 days.

(21) Appl. No.: 17/891,687

(22) Filed: Aug. 19, 2022

(65) Prior Publication Data

US 2022/0398693 A1 Dec. 15, 2022

Related U.S. Application Data

(63) Continuation of application No. PCT/JP2021/012428, filed on Mar. 24, 2021.

(60) Provisional application No. 63/001,012, filed on Mar. 27, 2020.

(51) Int. Cl.
*G06T 5/00* (2024.01)

(52) U.S. Cl.
CPC ...... *G06T 5/00* (2013.01); *G06T 2207/10024* (2013.01); *G06T 2207/10048* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 8,452,086 | B2* | 5/2013 | Saund | G06V 30/422 |
| | | | | 715/810 |
| 12,120,472 | B2* | 10/2024 | Lin | H04N 9/646 |
| 2007/0183657 | A1* | 8/2007 | Kidono | G06V 10/143 |
| | | | | 382/162 |
| 2017/0374299 | A1* | 12/2017 | Liu | H04N 1/6008 |
| 2021/0133936 | A1* | 5/2021 | Chandra | G06T 5/50 |
| 2022/0207663 | A1* | 6/2022 | Carbonera Luvizon | G06T 5/77 |
| 2022/0303515 | A1* | 9/2022 | Lin | H04N 23/11 |

(Continued)

FOREIGN PATENT DOCUMENTS

| JP | 2007-233833 A | 9/2007 |
| JP | 2018-207497 A | 12/2018 |

(Continued)

OTHER PUBLICATIONS

Notice of Reasons for Refusal dated Nov. 19, 2024 issued in the corresponding Japanese Patent Application No. 2022-510634, with English machine translation.

(Continued)

*Primary Examiner* — Tahmina N Ansari
(74) *Attorney, Agent, or Firm* — Rimon P.C.

(57) ABSTRACT

A color image inpainting method includes: obtaining a color image of an object to be recognized, the color image including a missing portion where at least part of image information is missing; obtaining an infrared image of the object; identifying the missing portion in the color image; and inpainting the missing portion in the color image identified in the identifying. The inpainting includes inpainting the missing portion by using information which is obtained from the infrared image and corresponds to the missing portion to obtain an inpainted color image of the object.

11 Claims, 7 Drawing Sheets

(56) References Cited

U.S. PATENT DOCUMENTS

| | | | |
|---|---|---|---|
| 2022/0398693 A1* | 12/2022 | Sasagawa | G06T 5/00 |
| 2024/0371098 A1* | 11/2024 | Lipkewich Povoledo | G06V 10/56 |

FOREIGN PATENT DOCUMENTS

| | | |
|---|---|---|
| JP | 2020-030681 A | 2/2020 |
| JP | 2020-042367 A | 3/2020 |

OTHER PUBLICATIONS

International Search Report (ISR) and Written Opinion of the International Searching Authority (ISA) issued on Jun. 22, 2021 in International (PCT) Application No. PCT/JP2021/012428 with its English translation.

Xiaopeng Zhang, et.al., "Enhancing photographs with Near Infra-Red images", 2008 IEEE Conference on Computer Vision and Pattern Recognition (https://ieeexplore.ieee.org/document/4587825).

Ahmed Elliethy, et.al., "Fast near infrared fusion-based adaptive enhancement of visible images", 2017 IEEE Global Conference on Signal and Information Processing (GlobalSIP) (https://ieeexplore.ieee.org/document/8308623).

Guilin Liu, et.al., "Image Inpainting for Irregular Holes Using Partial Convolutions", ECCV 2018 (https://rd.springer.com/chapter/10.1007/978-3-030-01252-6_6).

Olaf Ronneberger, et.al., "U-Net: Convolutional Networks for Biomedical Image Segmentation", arXiv:1505.04597, 2015 (https://arxiv.org/pdf/1505.04597.pdf).

\* cited by examiner (a)            (b)

(a)            (b)

(a)            (b)

METHOD FOR COMPLEMENTING COLOR IMAGE USING MACHINE-LEARNING MODEL

CROSS REFERENCE TO RELATED APPLICATIONS

This is a continuation application of PCT International Application No. PCT/JP2021/012428 filed on Mar. 24, 2021, designating the United States of America, which is based on and claims priority of U.S. Provisional Patent Application No. 63/001,012 filed on Mar. 27, 2020. The entire disclosures of the above-identified applications, including the specifications, drawings and claims are incorporated herein by reference in theft entirety.

FIELD

The present disclosure relates to a color image inpainting method and a neural network training method, and relates to image processing for inpainting missing portions in a color image.

BACKGROUND

In order to prevent a traffic accident caused by a vehicle driver, a system has been proposed which monitors the condition, physical condition, and the like of the driver, and prompts the driver through notifications and warnings. For example, an in-vehicle camera detects the driver's eye-gaze to detect dozing. However, in a system using a color image obtained from a general camera, missing portions occur in the color image due to the influence of the headlight of an oncoming vehicle or the driver wearing sunglasses. As a result, checking of the driver's eye-gaze may fail.

Accordingly, techniques have been conventionally proposed which inpaint missing portions in a color image obtained by a camera (see, for example, Non-Patent Literatures (NPLs) 1 to 3).

In NPL 1 and NPL 2, weight parameters are generated by comparing features, such as a contrast in a color image and an infrared image obtained by capturing the same object, and the color image and the infrared image are combined using the weight parameters. By doing so, image correction of edge components and contrast is performed.

Moreover, in NPL 3, noise (that is, a mask) is intentionally introduced into a color image and an inference engine is used which is trained through machine learning to restore the original color image from the color image with the noise introduced. By doing so, the missing portions in the color image are inpainted with the surrounding information.

In the specification of the present application, a color image is an image obtained by an image sensor including red, blue, and green pixels, and is also referred to as "an RGB image". Moreover, an infrared image is an image obtained by an image sensor including pixels that are sensitive to infrared rays, and is also referred to an IR image. A missing portion is a portion where image information is missing. In addition, in the specification of the present application, the term "machine learning" is also simply referred to as "learning".

CITATION LIST

Non Patent Literature

NPL 1: Xiaopeng Zhang, et. al., "Enhancing photographs with Near Infra-Red images", 2008 IEEE Conference on Computer Vision and Pattern Recognition (https://ieeexplore.ieee.org/document/4587825)

NPL 2: Ahmed Elliethy, et. al., "Fast near infrared fusion-based adaptive enhancement of visible images", 2017 IEEE Global Conference on Signal and Information Processing (GlobalSIP) (https://ieeexplore.ieee.org/document/8308623)

NPL 3: Guilin Liu, et. al., "Image Inpainting for Irregular Holes Using Partial Convolutions", ECCV 2018 (https://rd.springer.com/chapter/10.1007/978-3-030-01252-6_6)

SUMMARY

Technical Problem

However, in the techniques of NPL 1 and NPL 2, since the missing portions in a color image are simply inpainted by using an infrared image, the color information that cannot be obtained from the infrared image is not inpainted. Hence, there is a problem where even if the portion hidden by the sunglasses of the driver is inpainted, the degree of redness of the eyes, the driver's complexion (whether or not the driver is under the influence of alcohol), and the like cannot be determined.

In addition, in the technique of NPL 3, the missing portions in a color image are inpainted from the image information around the missing portions in the color image based on the knowledge obtained by learning. Hence, when a completely hidden portion is inpainted, the image after the inpainting results in a completely different image. Accordingly, when the eyes of the driver completely hidden by the sunglasses of the driver are inpainted, the eyes of the driver are inpainted with the eyes of another person.

In view of the above, an object of the present disclosure is to provide a color image inpainting method and a neural network training method which are capable of inpainting missing portions in a color image with an accuracy that is higher than before.

Solution to Problem

In order to achieve the above object, a color image inpainting method according to one aspect of the present disclosure includes: obtaining a color image of an object to be recognized, the color image including a missing portion where at least part of image information is missing; obtaining an infrared image of the object; identifying the missing portion in the color image; and inpainting the missing portion in the color image identified in the identifying. The inpainting includes inpainting the missing portion by using information which is obtained from the infrared image and corresponds to the missing portion to obtain an inpainted color image of the object.

In order to achieve the above object, a neutral network training method according to one aspect of the present disclosure is a training method of training a neural network which infers an inpainted color image of an object to be recognized from a color image of the object including a missing portion where at least part of image information is missing, the inpainted color image being the color image in which the missing portion is inpainted. The training method includes: preparing a color image of the object; preparing an infrared image of the object; preparing missing portion information indicating the missing portion; preparing a masked color image by masking the color image with the missing portion information, the masked color image being a color image including the missing portion; and inputting the masked color image, the infrared image, and the missing portion information to the neural network, and training the neural network with the color image as training data.

Advantageous Effects

The present disclosure provides a color image inpainting method and a neural network training method which are capable of inpainting a missing portion in a color image with an accuracy that is higher than before.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
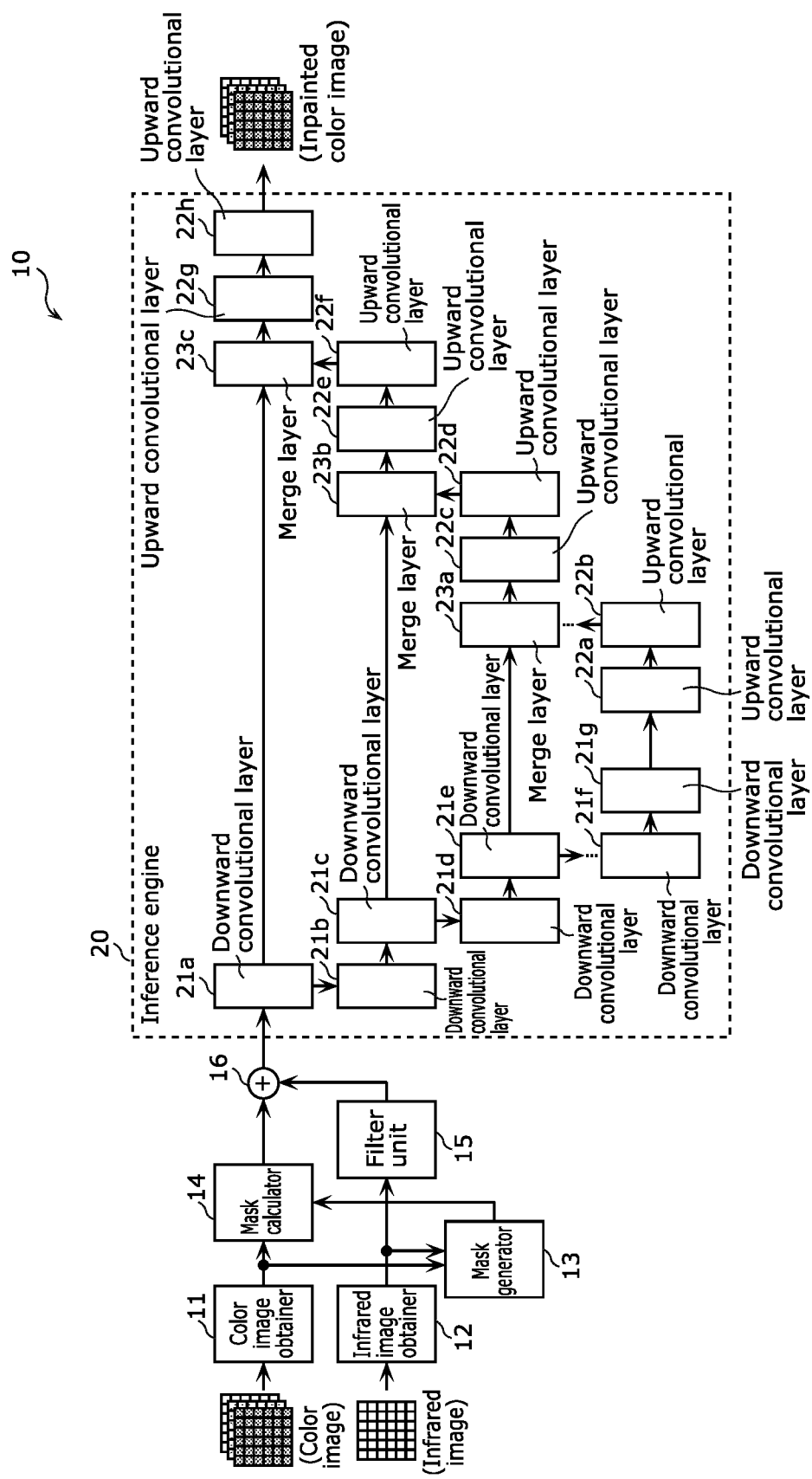
FIG. 1 is a block diagram illustrating a configuration of a color image inpainting device according to an embodiment.

Hereinafter, an embodiment of the present disclosure will be described in detail with reference to the drawings. In addition, the embodiment described below will show a specific example of the present disclosure. Numerical values, shapes, materials, structural elements, arrangement positions and connection forms of the structural elements, steps, order of steps, etc. shown in the following embodiment are examples, and are not intended to limit the present disclosure. In addition, each figure is not necessarily exactly illustrated. In each figure, substantially the same configurations are designated by the same reference numerals, and duplicate description will be omitted or simplified.

FIG. 1 is a block diagram illustrating a configuration of color image inpainting device 10 according to an embodiment. Color image inpainting device 10 is a device which inpaints one or more missing portions in a color image of an object to be recognized including a missing portion with a color image. Color image inpainting device 10 includes color image obtainer 11, infrared image obtainer 12, mask generator 13, mask calculator 14, filter unit 15, combiner 16, and inference engine 20. Color image inpainting device 10 is typically realized by a program executed by a processor. The program may be stored on a non-transitory computer-readable recording medium such as a digital versatile disc (DVD).

Color image obtainer 11 obtains a color image of an object to be recognized including one or more missing portions. For example, color image obtainer 11 obtains a color image from a camera including an RGB image sensor or from an auxiliary storage device such as a hard disk. A missing portion is a portion where image information is missing, and includes, for example, a portion where a desired image cannot be obtained due to unexpected appearance of a foreign matter (such as sunglasses covering a subject or a dust adhered to a lens), dipped whites or crushed shadows due to uneven exposure, or a defect in a portion of the RGB image sensor.

Infrared image obtainer 12 obtains an infrared image of the object that is the same as the object of the color image obtained by color image obtainer 11. For example, color image obtainer 11 obtains an infrared image from a camera including an IR image sensor or from an auxiliary storage device such as a hard disk. An infrared image includes, for example, information that cannot be obtained from a color image, such as the contours of eyes hidden by sunglasses.

Mask generator 13 generates a mask, which is map data indicating the missing portions in the color image, from the color image obtained by color image obtainer 11 and the infrared image obtained by infrared image obtainer 12. At this time, mask generator 13 generates a mask based on at least one of the chroma or luminance of the color image and at least one of the contrast or sharpness in the infrared image with respect to the color image.

More specifically, as indicated in following Math. 1, mask generator 13 calculates, from the color image obtained by color image obtainer 11, weight W which increases for a region as the chroma and the luminance decrease in the region.

[Math. 1]

$$W_s(x) = 1 - e^{-p_s(s(x))|s(x)-1|}, \quad p_s \in [0, 1], \ s \in [0, 1]$$

$$W_v(x) = 1 - e^{-p_v(v(x))|v(x)-1|}, \quad p_v \in [0, 1], \ v \in [0, 1]$$

$$W = W_s \odot W_v \qquad \text{Math. 1}$$

Here, s(x) and v(x) are respectively the chroma and the luminance at coordinates x of the color image, and $p_s(s(x))$ and $p_v(v(x))$ are respectively the frequencies obtained from the chroma and luminance histograms.

As indicated in following Math. 2, mask generator 13 calculates weight F that increases for a region as the contrast and sharpness in the color image obtained by color image obtainer 11 decrease with respect to the infrared image obtained by infrared image obtainer 12 in the region.

[Math. 2]

$$F(x) = \frac{\max\left(0, \ LC(I^{NIR}(x)) - LC(I^{RGB\_Y}(x))\right)}{I^{NIR}(x)} \qquad \text{Math. 2}$$

$$LC(I(x)) = \alpha\left(\max_{x' \in N(x)} I(x') - \min_{x' \in N(x)} I(x')\right) + (1-\alpha)\left(\max_{x' \in N(x)} \|\nabla I(x)\|\right),$$

where $N(x)$ is an $S \times S$ neighborhood around $x$

Here, $I^{NIR}(x)$ is the luminance at coordinates x of the infrared mage. The relation of $I^{RGB\_Y}(x)=v(x)$ is satisfied.

Mask generator 13 then generates, from weight W calculated by Math. 1 above and weight F calculated by Math. 2 above, map M indicating that, as indicated in Math. 3 below, the weighted sum itself of weight W and weight F is valid (that is, a missing portion) or as indicated in Math. 4 below, the weight sum is valid (that is, a missing portion) when greater than or equal to a predetermined value.

[Math. 3]

$$M = \max(0, \min(1, \gamma(\beta W + (1-\beta)F)))$$ Math. 3

[Math. 4]

$$M = \max(0, \text{sign}(\beta W + (1-\beta)F - \in)))$$ Math. 4

Mask calculator 14 generates a masked color image by performing mask processing on the color image obtained by color image obtainer 11 using the mask generated by mask generator 13. The masked color image is, for example, a color image in which the pixel values of the masked missing portion are zero (black) and the pixel values other than the missing portion remain the same as the original color image.

Filter unit 15 extracts high-frequency components from the infrared image obtained by infrared image obtainer 12, and generates an image of the extracted high-frequency components as an infrared image for processing. The high-frequency components of the infrared image are extracted in order to obtain information that is highly correlated with the color image. Specifically, filter unit 15 performs, according to the preset setting, filter processing referred to as a LoG (Laplacian Of Gaussian) filter in which a Gaussian filter and a Laplacian filter are combined, or filter processing referred to as a DoG (Difference Of Gaussian) filter in which a difference image (DoG image) between two Gaussian filter images with different standard deviation σ values is generated. In the LoG filter, the image is smoothed by the Gaussian filter to reduce noise, and then the contour is extracted by the Laplacian filter. Since the Laplacian filter acts as a second derivative, the Laplacian filter has a characteristic that noise is easily emphasized. On the other hand, the DoG filter has characteristics that the processing of the DoG filter is similar to that of the LoG filter, but the amount of calculation of the DoG filter is less than that of the LoG filter. Hence, the DoG filter is used in place of the LoG filter.

Combiner 16 combines the masked color image generated by mask calculator 14 and the infrared image for processing generated by filter unit 15. Specifically, combiner 16 combines the masked color image and the infrared image for processing, and outputs an image having a data structure that matches the configuration of the input layer of inference engine 20.

Inference engine 20 is a learning model trained to output a color image (inpainted color image) in which the missing portion is inpainted with a color image from the masked color image including missing portions. Specifically, inference engine 20 is a U-shaped convolutional neural network (that is, a deep learning model) referred to as a U-Net, and includes downward convolutional layers 21a to 21g, upward convolutional layers 22a to 22h, and merge layers 23a to 23c. In downward convolution layers 21a to 21g, convolution and pooling are performed, and the deeper the layer, the more local the image features and the smaller the size of the image. On the other hand, in upward convolution layers 22a to 22h, convolution and upsampling are performed, and the image is restored with a larger size while maintaining the features. In merge layers 23a to 23c, images of the same size are merged stepwise from the deepest layer. In the convolution, a scheme called "partial convolution" is used while transmitting information about the missing portions (see NPL 3).

Figure 2:
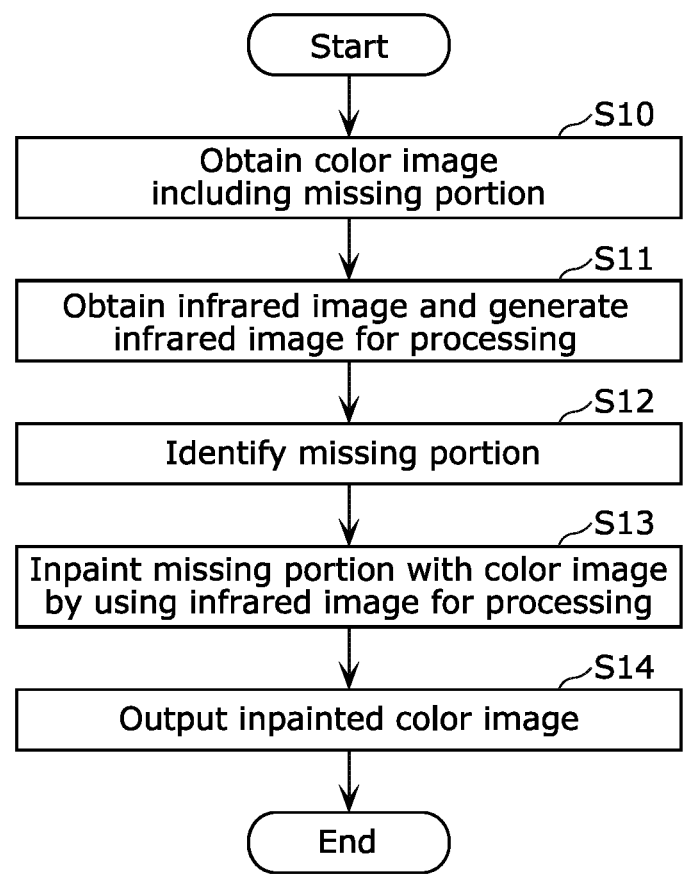
FIG. 2 is a flowchart illustrating an operation of the color image inpainting device according to the embodiment.

FIG. 2 is a flowchart illustrating an operation of color image inpainting device 10 (that is, a color image inpainting method) configured as described above according to the present embodiment.

First, color image obtainer 11 obtains a color image of an object to be recognized including one or more missing portions (color image obtaining step S10).

Next, color image inpainting device 10 causes infrared image obtainer 12 to obtain an infrared image of the object that is the same as the object of the color image, and causes filter unit 15 to apply a LoG filter or a DoG filter to the obtained infrared image to extract high-frequency components, so that an image of the extracted high-frequency components is generated as an infrared image for processing (infrared image obtaining step S11). In infrared image obtaining step S11, filter unit 15 may be bypassed so that the infrared image obtained by infrared image obtainer 12 may be generated as it is as an infrared image for processing. Moreover, infrared image obtaining step S11 may be performed before color image obtaining step S10, or may be performed in parallel with color image obtaining step S10.

Next, mask generator 13 identifies a missing portion in the color image obtained by color image obtainer 11 (missing portion identification step S12). Specifically, mask generator 13 generates a mask, which is map data indicating the missing portion in the color image, from the color image obtained by color image obtainer 11 and the infrared image obtained by infrared image obtainer 12. At this time, mask generator 13 calculates weight W that increases for a region as the chroma and the luminance decrease in the region from the color image obtained by color image obtainer 11, and calculates weight F that increases for a region as the contrast and the sharpness in the color image obtained by color image obtainer 11 decrease with respect to the infrared image obtained by infrared image obtainer 12 in the region. By using the weighted sum of the calculated weight W and weight F, mask generator 13 generates map M indicating the missing portion as in Math. 3 and Math. 4.

Color image inpainting device 10 then causes mask calculator 14, combiner 16, and inference engine 20 to inpaint the missing portion in the color image obtained by color image obtainer 11 identified in missing portion identification step S12 by using information obtained from the infrared image for processing corresponding to the missing portion (inpainting step S13). Specifically, mask calculator 14 first generates a masked color image by masking the color image obtained by color image obtainer 11 with the mask generated by mask generator 13. Combiner 16 then combines the masked color image generated by mask calculator 14 and the infrared image for processing generated by filter unit 15. Moreover, inference engine 20 generates a color image in which the missing portion is inpainted with a color image (that is, an inpainted color image) from the masked color image including the missing portion.

Finally, inference engine 20 outputs the inpainted color image generated (output step S14).

As described above, the color image inpainting method according to the present embodiment includes: color image obtaining step S10 for obtaining a color image of an object to be recognized including a missing portion where image information is missing; infrared image obtaining step S11 for obtaining an infrared image of the same object to generate an infrared image for processing; missing portion identification step S12 for identifying the missing portion in the obtained color image; and inpainting step S13 for inpainting the missing portion in the obtained color image identified in missing portion identification step S12. In inpainting step S13, the missing portion is inpainted with another color image by using information obtained from the infrared image for processing and corresponding to the missing portion. Although the information indicating the missing portion is used in step S13, information indicating the missing portion identified in step S12 may be used., With this, the missing portion in the color image is correctly restored with a color image by using the infrared image that includes information that cannot be obtained by a visible light image. Accordingly, unlike the techniques disclosed in NPL 1 and NPL 2, for example, the portion hidden by the sunglasses of the driver is inpainted with a color image, and the degree of redness of the eyes, the driver's complexion (whether or not the driver is under the influence of alcohol), and the like can also be determined. In addition, unlike the technique in NPL 3, since an infrared image corresponding to the missing portion is also used, the problem that the completely hidden portion is inpainted by a completely different image can be avoided. Hence, it is possible to achieve a color image inpainting method capable of inpainting a missing portion in a color image with an accuracy that is higher than before.

Here, in infrared image obtaining step S11, an image of the high-frequency components extracted from the infrared image is generated as an infrared image for processing. With this, in order to inpaint the missing portion, the high-frequency components of the infrared image are used instead of the infrared image itself. Hence, the feature differences on the image due to the difference in the reflection characteristics between visible light used to generate a color image and near infrared light used to generate an infrared image is alleviated, and the missing portion is inpainted with high-quality restoration.

Moreover, in missing portion identification step S12, the missing portion is identified based on at least one of the chroma or the luminance of the color image and at least one of the contrast and the sharpness in the infrared image with respect to the color image. With this, the missing portion is identified using the characteristics of both the color image and the infrared image, so that the portion where image information is missing unlike the surroundings is identified with a high accuracy.

Next, the training method of inference engine 20 (that is, the neural network training method) according to the above embodiment will be described.

Figure 3:
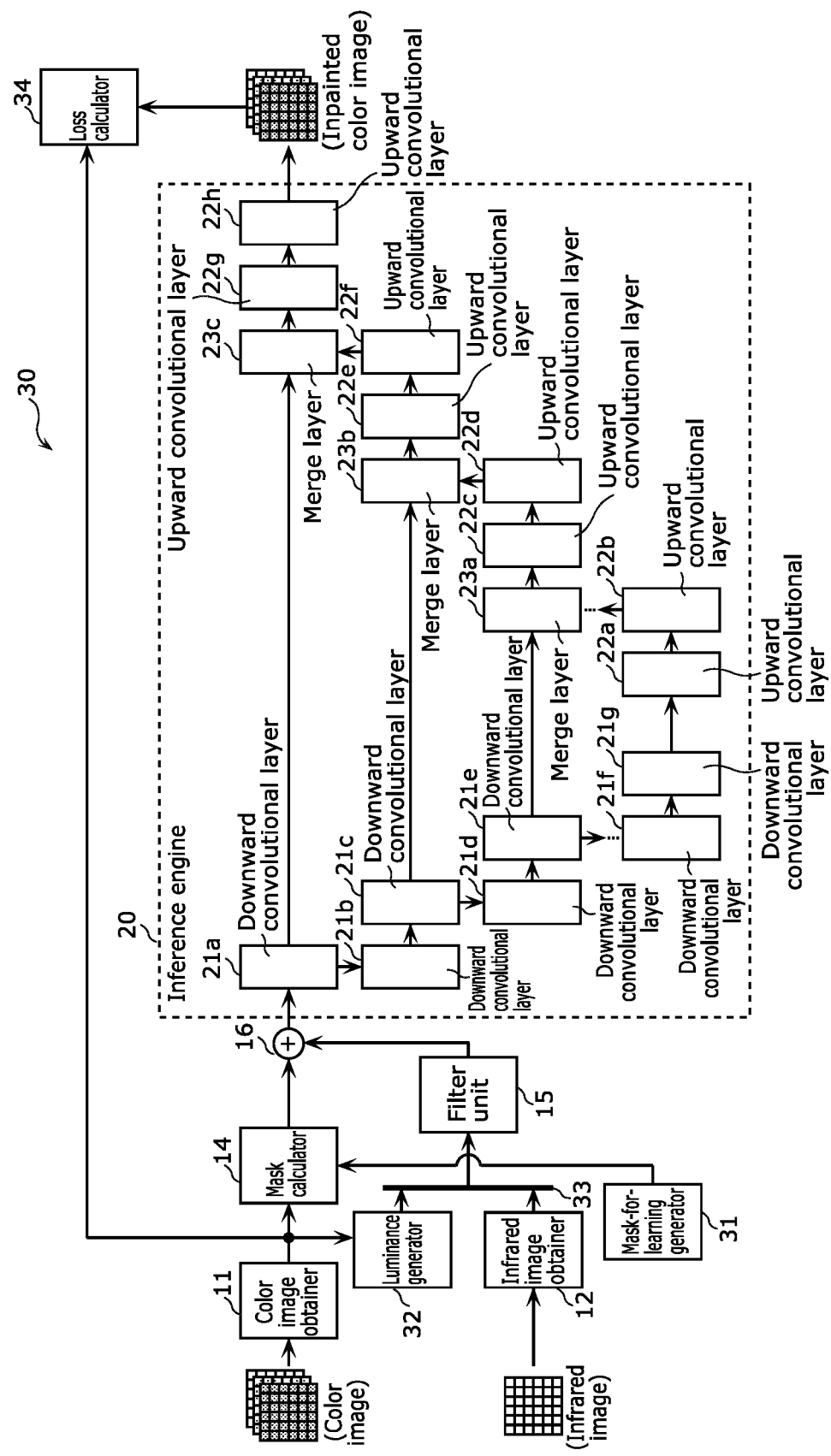
FIG. 3 is a block diagram illustrating a configuration of a neural network training device which trains an inference engine included in the color image inpainting device according to the embodiment.

FIG. 3 is a block diagram illustrating a configuration of neural network training device 30 which trains inference engine 20 included in color image inpainting device 10 according to the above embodiment. Inference engine 20 to be trained is also illustrated in FIG. 3.

Neural network training device 30 is a device which trains inference engine 20. Neural network training device 30 includes mask-for-learning generator 31, luminance generator 32, selector 33, and loss calculator 34, in addition to color image obtainer 11, infrared image obtainer 12, mask calculator 14, filter unit 15, and combiner 16 which are included in color image inpainting device 10 according to the above embodiment.

Color image obtainer 11 obtains a color image of an object to be recognized as input data for learning. For example, color image obtainer 11 obtains a color image for learning from an auxiliary storage device such as a hard disk. The color image for learning is a color image of an object to be recognized which does not include a missing portion. For example, the color image for learning is a color image obtained by capturing a driver without sunglasses with a camera under a normal environment. The color image obtained by color image obtainer 11 is output to mask calculator 14, luminance generator 32, and loss calculator 34.

Mask-for-learning generator 31 generates a mask used to generate a missing portion, that is, missing portion information indicating the missing portion. For example, mask-for-learning generator 31 randomly generates a group of partial regions in the color image obtained by color image obtainer 11 as a whole, and generates, as missing portion information, a mask indicating the generated partial regions as the missing portion.

Mask calculator 14 masks the color image obtained by color image obtainer 11 with the missing portion information generated by mask-for-learning generator 31, so that a masked color image that is a color image including a missing portion is generated.

Luminance generator 32 generates a grayscale image from the color image obtained by color image obtainer 11. Specifically, luminance generator 32 generates a grayscale image by extracting only the luminance components in the color image obtained by color image obtainer 11. The grayscale image is used in place of an infrared image (that is, as a pseudo-infrared image) when it is difficult to prepare the infrared image.

Infrared image obtainer 12 obtains an infrared image of the object that is the same as the object of the color image. For example, color image obtainer 11 obtains an infrared image of the object from an auxiliary storage device such as a hard disk.

Selector 33 selects either the grayscale image generated by luminance generator 32 or the infrared image obtained by infrared image obtainer 12 according to the preset setting, and outputs the selected image to filter unit 15. For example, when the infrared image obtained by infrared image obtainer 12 is not stored in the auxiliary storage device, selector 33 selects the grayscale image generated by luminance generator 32. When the infrared image obtained by infrared image obtainer 12 is stored in the auxiliary storage device, selector 33 selects the infrared image. Selector 33 is provided to enable learning of inference engine 20 by using any one of an infrared image and a grayscale image that is used instead of the infrared image.

Filter unit 15 extracts high-frequency components from the grayscale image or the infrared image output from selector 33, and generates an image of the extracted high-frequency components as an infrared image for processing. Specifically, filter unit 15 applies a LoG filter or a DoG filter to the grayscale image or the infrared image output from selector 33, and outputs the obtained image as the infrared image for processing.

Combiner 16 combines the masked color image generated by mask calculator 14 and the infrared image for processing generated by filter unit 15. Specifically, combiner 16 combines the masked color image and the infrared image for processing, and outputs an image having a data structure that matches the configuration of the input layer of inference engine 20, and inputs the image to inference engine 20.

Loss calculator 34 causes inference engine 20 to perform supervised learning with the color image obtained by color image obtainer 11 as training data. Specifically, loss calculator 34 adjusts the model parameters of inference engine 20 by backpropagation, stochastic gradient descent and so on, so that the inpainted color image output by inference engine 20 is brought closer to the color image obtained by color image obtainer 11.

Figure 4:
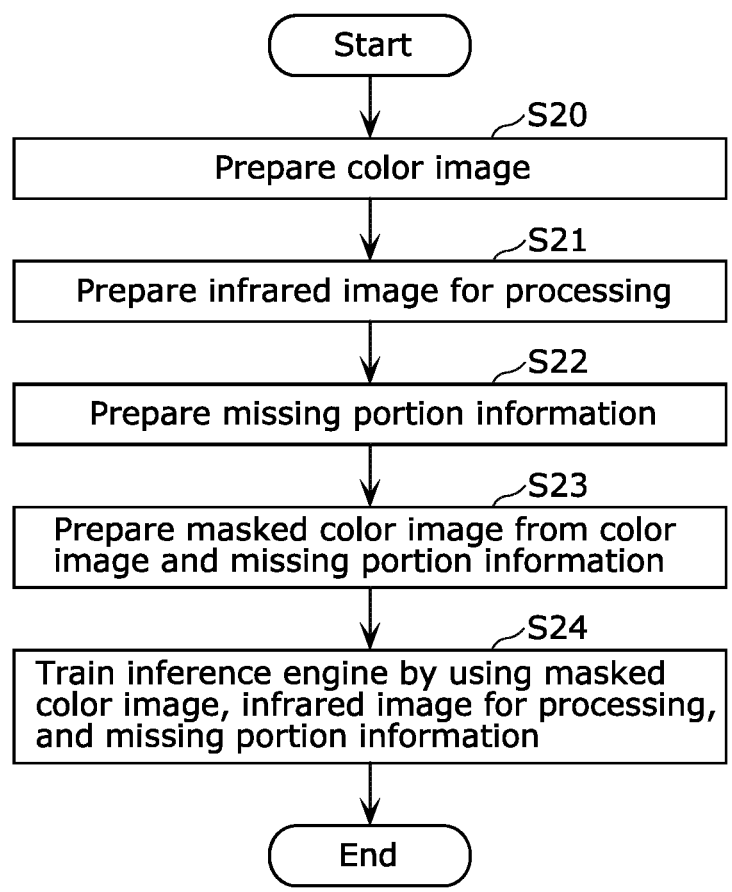
FIG. 4 is a flowchart illustrating an operation of the neural network training device according to the embodiment.

FIG. 4 is a flowchart illustrating an operation (that is, the neural network training method) of neural network training device 30 according to the present embodiment configured as described above.

First, color image obtainer 11 prepares a color image of an object to be recognized as input data for learning (color image preparation step S20). For example, color image obtainer 11 prepares the color image by obtaining a color image for learning from an auxiliary storage device such as a hard disk. The prepared color image is a color image of an object to be recognized which does not include a missing portion.

Next, neural network training device 30 causes luminance generator 32, infrared image obtainer 12, and selector 33 to prepare an infrared image for processing of the object that is the same as the object of the color image for learning (infrared image preparation step S21). More specifically, luminance generator 32 generates a grayscale image from the color image obtained by color image obtainer 11. On the other hand, infrared image obtainer 12 obtains an infrared image of the object. Selector 33 selects either the grayscale image generated by luminance generator 32 or the infrared image obtained by infrared image obtainer 12 according to the preset setting, and outputs the selected image to filter unit 15. Moreover, filter unit 15 applies a LoG filter or a DoG filter to the grayscale image or the infrared image output from selector 33 to extract high-frequency components, and prepares an image of the extracted high-frequency components as an infrared image for processing.

Mask-for-learning generator 31 then prepares a mask used to generate a missing portion, that is, missing portion information indicating the missing portion (missing portion information preparation step S22). The missing portion information is, for example, mask information which indicates, as the missing portion, a group of partial regions in the color image obtained by color image obtainer 11 as a whole.

Next, mask calculator 14 masks the color image obtained by color image obtainer 11 with the missing portion information generated by mask-for-learning generator 31, so that the masked color image that is a color image including the missing portion is prepared (masked color image preparation step S23).

Then, neural network training device 30 inputs the masked color image prepared in masked color image preparation step S23, the infrared image for processing prepared in infrared image preparation step S21, and the missing portion information prepared in missing portion preparation step S22, and trains inference engine 20 with the color image prepared in color image preparation step S20 as training data (training step S24). More specifically, combiner 16 generates an image having a data structure that matches the configuration of the input layer of inference engine 20 by combining the masked color image generated by mask calculator 14 and the infrared image for processing generated by filter unit 15, and inputs the generated image and the missing portion information generated by mask-for-learning generator 31 to inference engine 20, Loss calculator 34 then adjusts the model parameters of inference engine 20 with the color image obtained by color image obtainer 11 as training data, so that the inpainted color image output by inference engine 20 is brought closer to the training data.

In such a manner, neural network training device 30 trains inference engine 20.

Figure 5:
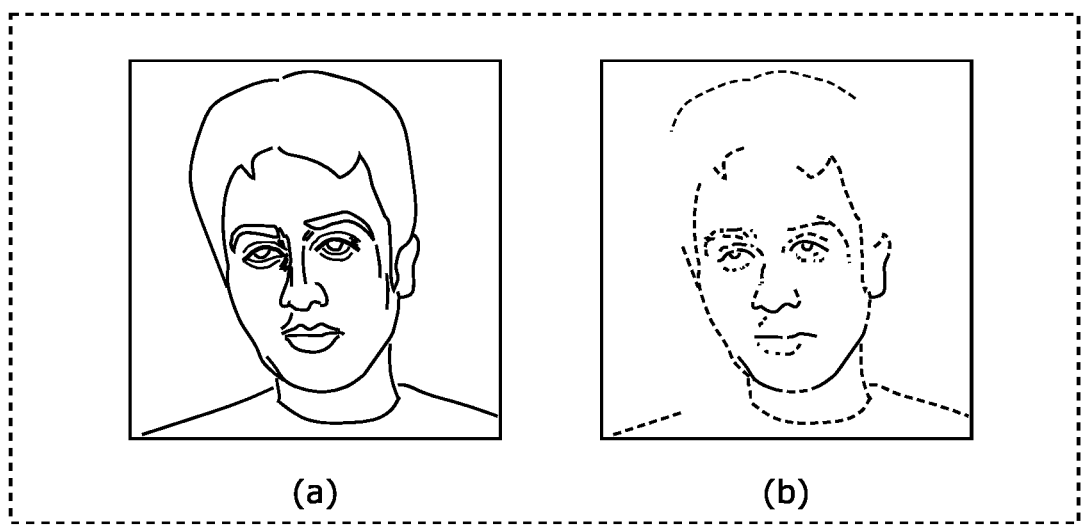
FIG. 5 illustrates examples of a color image ((a) in FIG. 5) and a grayscale image as a pseudo-infrared image ((b) in FIG. 5) of a same object to be recognized used for training the inference engine in an experiment.

Next, an experiment performed on an operation of color image inpainting device 10 according to the embodiment will be described. FIG. 5 illustrates a color image ((a) in FIG. 5) and a grayscale image ((b) in FIG. 5) as a pseudo-infrared image of the same object used for learning of inference engine 20 in the experiment. The images illustrated in FIG. 5 are schematic diagrams in which the actually used Images are simplified into black-and-white images for convenience of illustration. The same applies to FIG. 6 and FIG. 7 to be described later. At the time of learning in the experiment, among the infrared image and the grayscale image as the pseudo-infrared image input to selector 33, only the grayscale image as the pseudo-infrared image was used.

Figure 6:
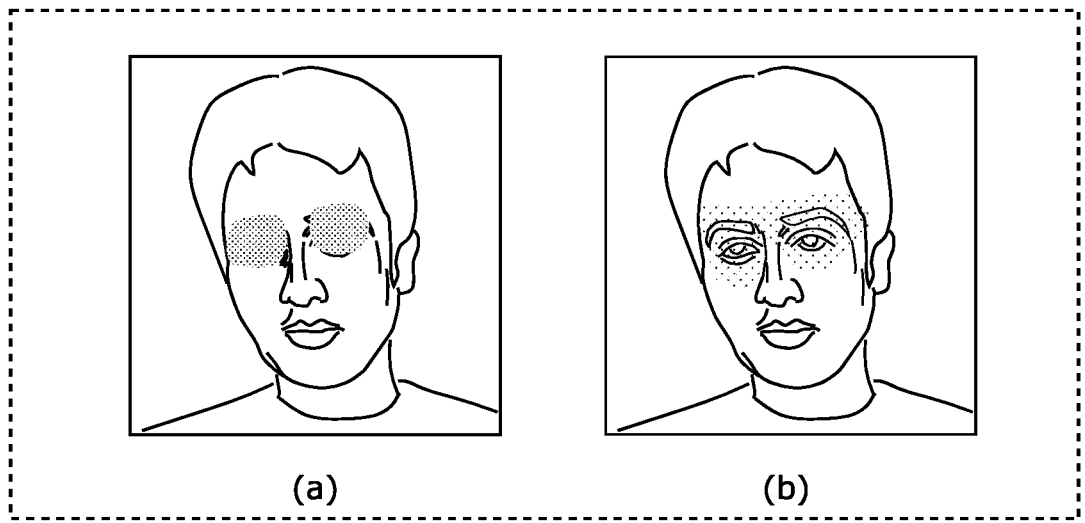
FIG. 6 illustrates an example of inpainting performed by the color image inpainting device which has completed learning using the images illustrated in FIG. 5 in the experiment.

FIG. 6 Illustrates an example of inpainting performed by color image inpainting device 10 which has completed learning using the images illustrated in FIG. 5 in the experiment. More specifically, in FIG. 6, (a) illustrates an example of a color image including missing portions input to color image inpainting device 10. The missing portions are the regions of sunglasses on the human face. In FIG. 6, (b) illustrates an inpainted color image output by color image inpainting device 10. In the inpainted color image illustrated in (b) in FIG. 6, the missing portions are restored with a color image close to the true image.

Figure 7:
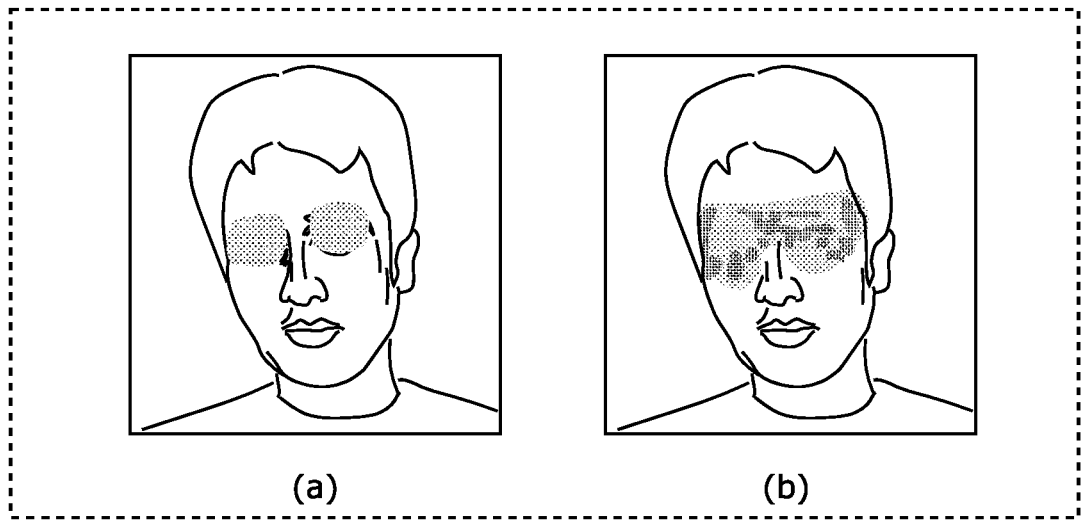
FIG. 7 illustrates an example of inpainting performed by a color image inpainting method according to a comparative example.

FIG. 7 illustrates an example of inpainting performed by a color image inpainting method according to a comparative example of the method disclosed in NPL 3 (that is, a method of inpainting a missing portion in a color image by using only a color image without using an infrared image). More specifically, in FIG. 7, (a) illustrates an example of an input color image which includes missing portions in the color image inpainting method according to the comparative example and which is the same as that illustrated in (a) in FIG. 6. In FIG. 7, (b) illustrates an output inpainted color image in the color image inpainting method according to the comparative example. In the inpainted color image illustrated in (b) in FIG. 7, as can be seen from the comparison with (b) in FIG. 6, the missing portions are restored with a rough image and are not restored correctly.

As described above, the color image inpainting method according to the present embodiment includes: color image obtaining step S10 for obtaining a color image of an object to be recognized including a missing portion where image information is missing; infrared image obtaining step S11 for obtaining an infrared image of the same object to generate an infrared image for processing; missing portion identification step S12 for identifying the missing portion in the obtained color image; and inpainting step S13 for inpainting the missing portion in the obtained color image identified in missing portion identification step S12. Inpainting step S13 includes inpainting the missing portion with another color image by using information which is obtained from the infrared image for processing and corresponds to the missing portion. Here, in infrared image obtaining step S11, as an example, an infrared image is generated as it is as an infrared image for processing. In inpainting step S13, the missing portion is inpainted by inference engine 20 trained to, by using a color image for learning, an infrared image for learning corresponding to the color image for learning, and missing portion information for learning, infer an original color image for learning from a color image with a missing portion for learning generated from the color image for learning and the missing portion information for learning and the infrared image for learning.

With this, since inference engine 20 is used which is trained to infer the original color image for learning from a color image with a missing portion for learning and an infrared image for learning, a color image, in which the missing portion is inpainted with a color image, is restored from the color image including the missing portion.

Moreover, in inpainting step S13, it may be that the missing portion is inpainted by an inference engine trained to infer an original color image for learning from a color image with a missing portion for learning and an infrared image for learning and processing by using: a color image for learning; the infrared image for learning and processing; and missing portion information for learning, the infrared image for learning and processing being an image of a high-frequency component extracted from an infrared image for learning corresponding to the color image for learning, the color image with the missing portion for learning being generated from the color image for learning and the missing portion information for learning.

With this, since the infrared image for learning and processing is an image of the high-frequency components extracted from the infrared image for learning, the feature differences on an image due to the difference in reflection characteristics between visible light used to generate a color image and near infrared light used to generate an infrared image is alleviated. As a result, the missing portion is inpainted with high-quality restoration.

Moreover, the neural network training method according to the present embodiment is a training method of a neural network (that is, inference engine 20) which infers an inpainted color image of an object to be recognized from a color image of the object including a missing portion where image information is missing. The inpainted color image is the color image in which the missing portion is inpainted. The training method includes: color image preparation step S20 for preparing a color image of the object; infrared image preparation step S21 for preparing an infrared image for processing of the object; missing portion information preparation step S22 for preparing missing portion information indicating the missing portion; masked color image preparation step S23 for preparing a masked color image that is a color image including the missing portion by masking the color image with the missing portion information; and training step S24 for inputting the masked color image, the infrared image for processing, and the missing portion information to the neural network, and training the neutral network with the color image prepared in color image preparation step S20 as training data.

With this, it is possible to train the neural network (that is, inference engine 20) which restores a color image in which the missing portion is inpainted with a color image from the color image including the missing portion. Accordingly, unlike the techniques disclosed in NPL 1 and NPL 2, color image inpainting device 10 which uses the neural network (that is, inference engine 20) trained in such a manner inpaints the missing portion with a color image. Hence, for example, the portion hidden by the sunglasses of the driver is inpainted with a color image, and the degree of redness of the eyes, the driver's complexion (whether or not the driver is under the influence of alcohol), etc. can also be determined. Moreover, unlike the technique disclosed in NPL 3, since an infrared image corresponding to the missing portion is also used, the problem where the completely hidden portion is inpainted with a completely different image can be avoided. Accordingly, it is possible to achieve color image inpainting device 10 capable of inpainting a missing portion in a color image with an accuracy higher than before.

Here, in infrared image preparation step S21, an infrared image for processing may be prepared by capturing an object to be recognized with an infrared camera. With this, for example, an infrared image is used which is capable of providing information that cannot be obtained from a visible light image, such as the contour of the eyes hidden by sunglasses. Accordingly, it is possible to achieve a neural network (that is, inference engine 20) which is capable of correctly restoring the missing portion in the color image with a color image.

Moreover, in infrared image preparation step S21, a grayscale image may be generated from the color image, and high-frequency components in the grayscale image may be extracted to generate an infrared image for processing. With this, even when it is difficult to prepare an infrared image, the neural network (that is, inference engine 20) can be appropriately trained by using the grayscale image as a pseudo-infrared image in place of the infrared image, Neural network training device 30 according to the above embodiment includes a configuration (luminance generator 32, infrared image obtainer 12, and selector 33) which selectively uses an infrared image or a pseudo-infrared image. Instead of such a configuration, neural network training device 30 may include only luminance generator 32 and always uses a pseudo-infrared image, or include only infrared image obtainer 12 and always uses an infrared image.

Figure 8:
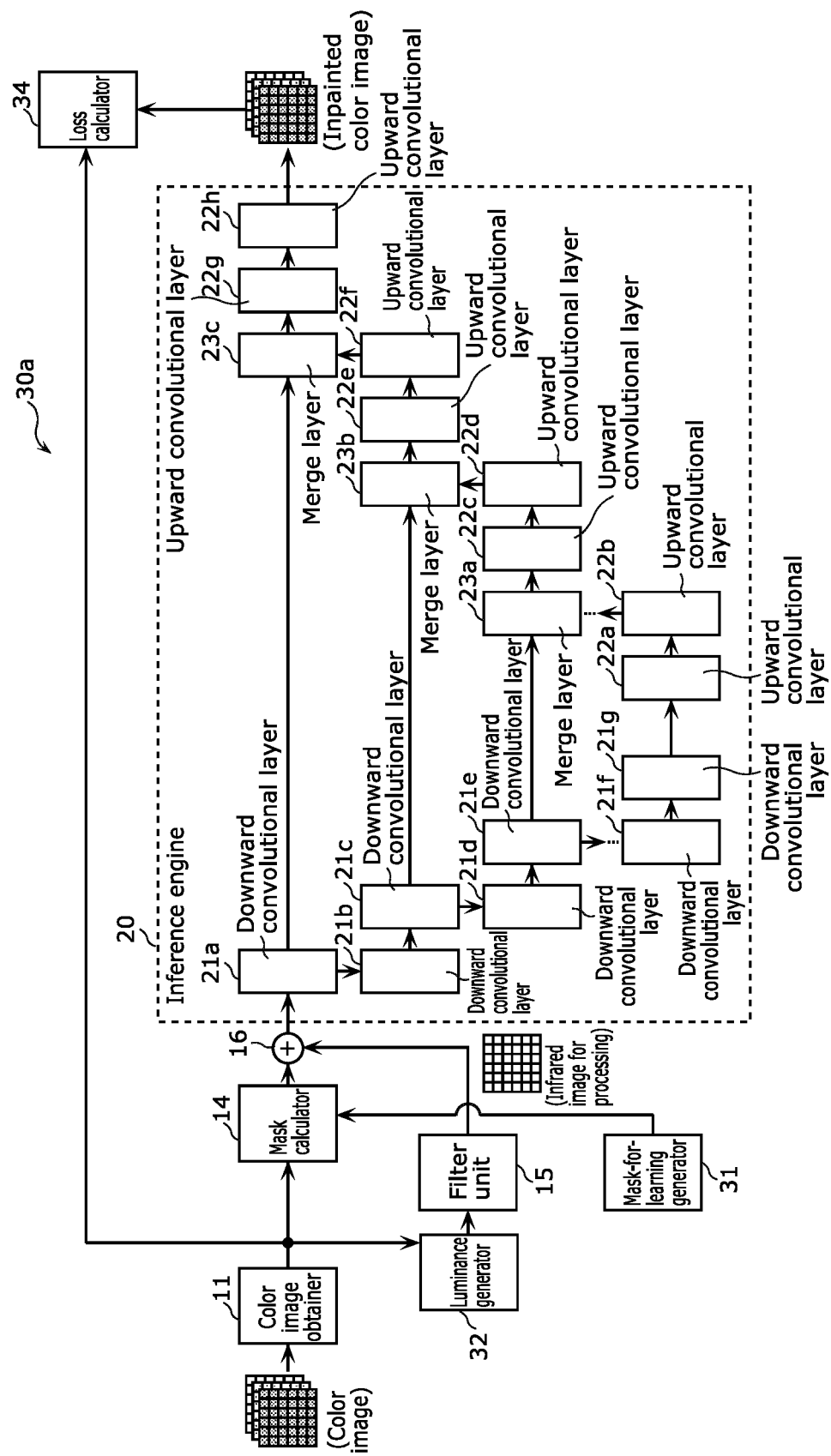
FIG. 8 is a block diagram illustrating a configuration of a neural network training device according to Variation 1 of the embodiment.

FIG. 8 is a block diagram illustrating a configuration of neural network training device 30a according to Variation 1 of the embodiment in which only luminance generator 32 is included among luminance generator 32, infrared image obtainer 12, and selector 33 in neural network training device 30 illustrated in FIG. 3. Neural network training device 30a is also capable of appropriately training inference engine 20 by using a pseudo-infrared image. In the learning in the above experiment, such a neural network training device 30a is used.

Figure 9:
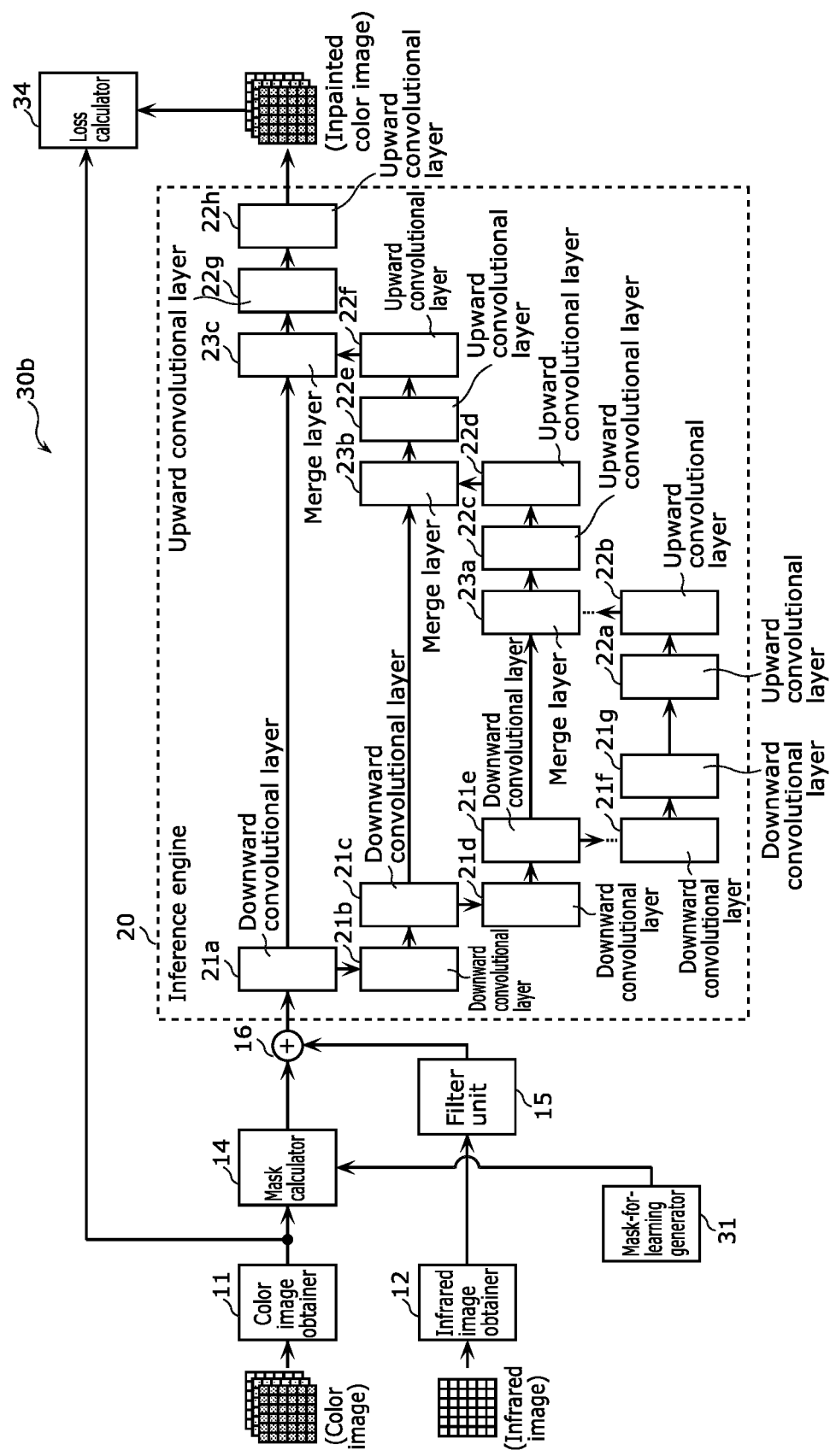
FIG. 9 is a block diagram illustrating a configuration of a neural network training device according to Variation 2 of the embodiment.

FIG. 9 is a block diagram illustrating a configuration of neural network training device 30b according to Variation 2 of the embodiment in which only infrared image obtainer 12 is included among luminance generator 32, infrared image obtainer 12, and selector 33 in neural network training device 30 illustrated in FIG. 3. Neural network training device 30b is also capable of appropriately training inference engine 20 by using an infrared image.

Although the color image inpainting method and the neural network training method according to the present disclosure have been described above based on the embodiment and variations thereof, the present disclosure is not limited to such an embodiment and variations. Various modifications of the embodiment and variations as well as embodiments resulting from arbitrary combinations of structural elements of the embodiment and variations thereof that may be conceived by those skilled in the art are intended to be included within the scope of the present disclosure as long as these do not depart from the essence of the present disclosure.

For example, in the above embodiment, color image inpainting device 10 and neural network training device 30 include filter unit 15, but color image inpainting device 10 and neural network training device 30 do not always have to include filter unit 15. Filter unit 15 is used for alleviating the feature differences on an image due to the difference in reflection characteristics between visible light used to generate a color image and near infrared light used to generate an infrared image. Filter unit 15 does not always have to be included because depending on the environment in which a color image and an infrared image are obtained by a camera, such feature differences may be small, that is, the necessity may be low.

Moreover, in the above embodiment, mask generator 13 generates a mask by using the chroma and luminance of the color image obtained by color image obtainer 11 and the contrast and sharpness in the infrared image obtained by infrared image obtainer 12. However, the present disclosure is not limited to such an example. Mask generator 13 may generate a mask by using at least one of the chroma or the luminance of the color image and at least one of the contrast or the sharpness in the infrared image with respect to the color image. It is because, depending on the color of an object to be recognized, and the environment in which a color image and an infrared image are obtained by cameras, a mask may be generated which accurately indicates a missing portion in the color image by using one of the chroma and the luminance of the color image and one of the contrast and sharpness in the infrared image with respect to the color image.

Moreover, in the above embodiment, color image inpainting device 10 is typically realized by a program executed by a processor, but is not limited to such an example. Color image inpainting device 10 may be realized by hardware such as an electronic circuit. For example, inference engine 20 may be realized by a field programmable gate array.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The color image inpainting method and the neural network training method according to the present disclosure can be used as a color image inpainting device capable of inpainting a missing portion in a color image with an accuracy that is higher than before, for example, as a safe driving maintenance system for inpainting a portion hidden by the sunglasses of a driver to determine the degree of redness of the eyes, and the driver's complexion.

The invention claimed is:

1. A color image inpainting method comprising:
obtaining a color image of an object to be recognized, the color image including a missing portion where at least part of image information is missing;
obtaining an infrared image of the object;
identifying the missing portion in the color image; and
after the missing portion in the color image is identified, inpainting the missing portion in the color image identified in the identifying to obtain an inpainted color image of the object,
wherein the inpainting includes inpainting the missing portion by using information which is obtained only from a part of the infrared image, the part corresponding to the missing portion in the color image.

2. The color image inpainting method according to claim 1,
wherein an image of a high-frequency component extracted from the infrared image is used for the inpainting.

3. The color image inpainting method according to claim 1,
wherein the identifying includes identifying the missing portion based on (i) at least one of a chroma or a luminance of the color image and (ii) at least one of a contrast or a sharpness in the infrared image.

4. The color image inpainting method according to claim 2,
wherein the identifying includes identifying the missing portion based on (i) at least one of a chroma or a luminance of the color image and (ii) at least one of a contrast or a sharpness in the infrared image.

5. The color image inpainting method according to claim 1,
wherein the inpainting includes inpainting the missing portion by an inference engine trained to infer a color image with no missing portion from a color image with a missing portion and an infrared image.

6. The color image inpainting method according to claim 3,
wherein the inpainting includes inpainting the missing portion by an inference engine trained to infer a color image with no missing portion from a color image with a missing portion and an infrared image.

7. The color image inpainting method according to claim 4,
wherein the inpainting includes inpainting the missing portion by an inference engine trained to infer a color image with no missing portion from a color image with a missing portion and an infrared image.

8. The color image inpainting method according to claim 2,
wherein the inpainting includes:
preparing a first image, a first infrared image and missing portion information; and
inpainting the missing portion by an inference engine trained to infer a first color image from a second color image with a missing portion and a second infrared image, and
wherein the second infrared image is an image of a high-frequency component extracted from the first infrared image, and the second color image with the missing portion is generated from the first color image and the missing portion information.

9. A training method of training a neural network which infers an inpainted color image of an object to be recognized from a color image of the object including a missing portion where at least part of image information is missing, the inpainted color image being the color image in which the missing portion is inpainted, the training method comprising:
preparing a color image of the object;
preparing an infrared image of the object;
preparing missing portion information indicating the missing portion and including (i) at least one of a chroma or a luminance of the color image and (ii) at least one of a contrast or a sharpness in the infrared image;
preparing a masked color image by masking the color image with the missing portion information, the masked color image being a color image including the missing portion; and
inputting the masked color image, the infrared image, and the missing portion information to the neural network, and training the neural network with the color image as training data.

10. The training method according to claim 9,
wherein the preparing of the infrared image includes preparing the infrared image by capturing the object with an infrared camera.

11. The training method according to claim 9,
wherein the preparing of the infrared image includes preparing the infrared image by generating a grayscale image from the color image and further extracting a high-frequency component from the grayscale image.

* * * * *